(No Model.)
W. O. WEBBER.
STEAM SEPARATOR.
No. 486,144. Patented Nov. 15, 1892.
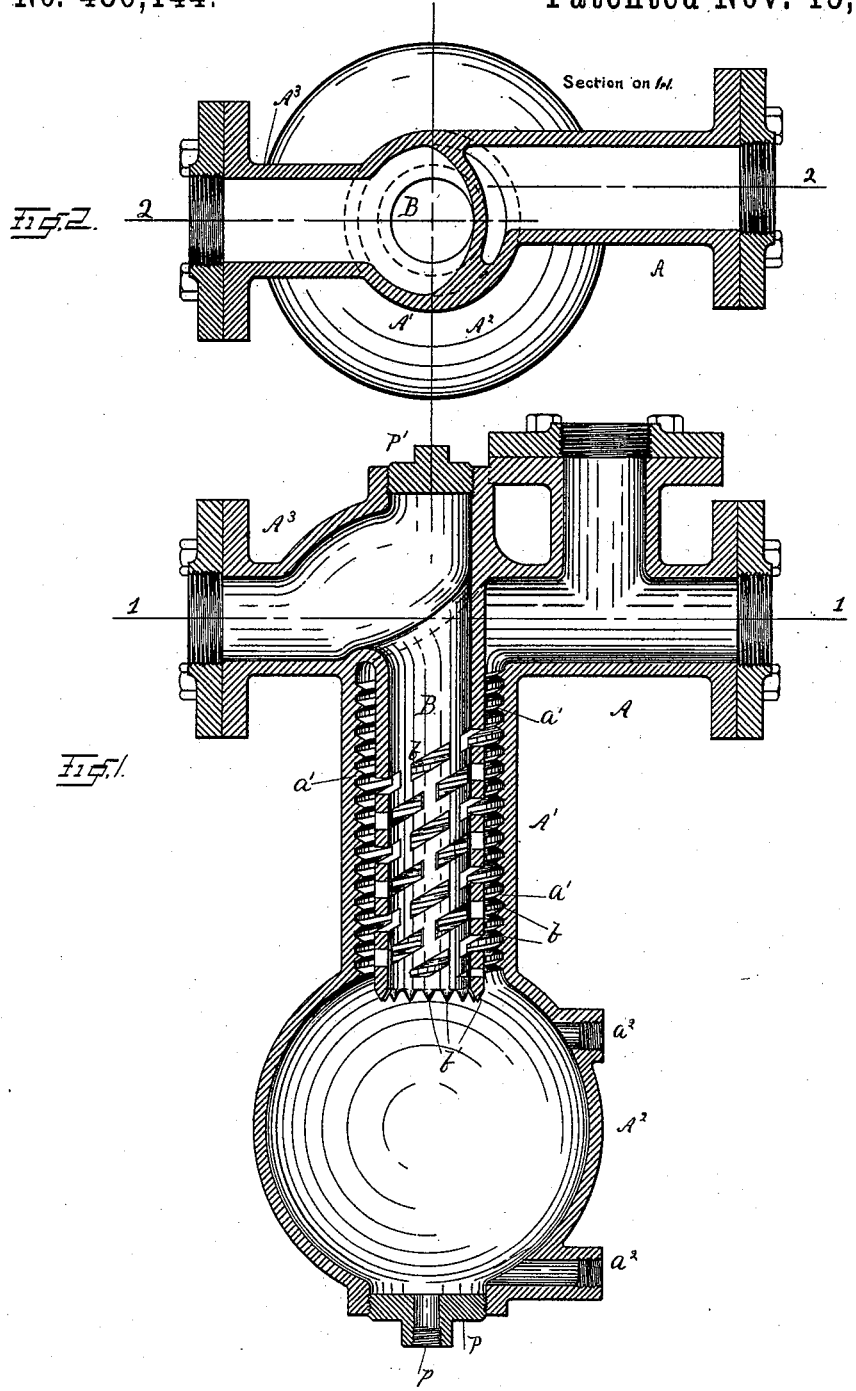
WITNESSES:
M. H. Hallock,
Wm. Marks, Jr.
INVENTOR
W. O. Webber
BY
Hallock & Hallock
ATTORNEYS.

UNITED STATES PATENT OFFICE.

WILLIAM O. WEBBER, OF ERIE, PENNSYLVANIA.

STEAM-SEPARATOR.

SPECIFICATION forming part of Letters Patent No. 486,144, dated November 15, 1892.

Application filed February 18, 1892. Serial No. 421,944. (No model.)

*To all whom it may concern:*

Be it known that I, WILLIAM O. WEBBER, a citizen of the United States, residing at Erie, in the county of Erie and State of Pennsylvania, have invented certain new and useful Improvements in Steam-Separators; and I do hereby declare the following to be a full, clear, and exact description of the invention, such as will enable others skilled in the art to which it appertains to make and use the same.

This invention relates to steam-separators; and it consists in certain improvements in the construction thereof, as will be hereinafter fully described, and pointed out in the claims.

The invention is illustrated in the accompanying drawings, as follows:

Figure 1 is a vertical section on the line 2 2 in Fig. 2. Fig. 2 is a section on the line 1 1 in Fig. 1.

The device consists of a shell or case having the inlet-nozzle A, outlet-nozzle $A^3$, the separator-chamber A', drip-chamber $A^2$, and the contained dry passage B. Preferably these parts are cast integral, as shown, but not essentially so. In axial line with the separator-chamber A' and the dry-steam chamber, which parts are concentric, are plugs P and P', closing openings which afford access to the interior when desired. A drain-pipe will connect with the plug P at $p$.

In the drip-chamber shell are openings $a^2$ $a^2$ for connecting an ordinary water-gage tube. On the inner walls of the separator-chamber A' there is a groove formed by corrugations $a'$, which are disposed in the form of a screw or helix. Concentrically contained within the chamber A' is the dry-steam chamber B, which extends slightly below the separator-chamber into the drip-chamber and is open at its lower end, and also has helically-arranged, diagonal, and parallel-sided openings $b$ through it into the separator-chamber. The lower end of the pipe or chamber B is provided with a series of pointed teeth or serrations. The helical corrugation $a'$ on the inner wall of the separator-chamber is some distance from the exterior wall of the dry-steam chamber B, leaving a free passage between the two chambers. The separator-chamber connects with the inlet-passage A and the dry-steam chamber with the outlet-passage $A^3$. The helically-disposed corrugation $a'$ is not intended to nor does it form a helical passage for the steam, as has been heretofore practiced in devices for the same purpose as this—as, for example, in Letters Patent No. 395,185, granted to W. L. Simpson, December 25, 1888. The object in disposing the corrugation $a'$ as shown is, first, to impart to the steam while passing a rotative action around the chamber without confining it in a helical passage, and, second, to provide a downwardly-inclined surface for the drainage of the condensation which gathers on the walls of the chamber A'.

The openings $b$ through the walls of the passage or chamber B are made parallel-sided and inclined, as shown, to afford quicker drainage than would occur if the holes were round or rectilinear and set horizontally. Whatever moisture gathers on the walls of these openings must quickly accumulate at the lower point of the opening and will there form in drops and run down the sides of the chamber, and as these openings are preferably placed in vertical alternation the water from one will run into the next below and carry with it all condensation standing on the walls of the pipe B or the walls of the opening $b$.

The operation of the device should be easily understood, as it does not differ essentially in general action from other forms of similar devices.

The steam enters through the nipple A, passes down through the column A' outside of the parallel passage B, and finds its way into said passage B through the inlets $b$ or through the open lower end of the passage B. In passing through the passage between the pipes A' and B the steam is given a more or less cyclonic action by the helical rib on the inner wall of the pipe A', and the particles of condensation contained in the steam naturally find their way largely onto the helically-ribbed wall and drain down the helix. The lighter and drier steam finds its way into the passage B through the helically-arranged parallel-sided openings $b$ through the core-pipe B. The wetter steam naturally hugs the corrugated wall $a'$ of the outer casing A' by reason of the cyclonic action given to the steam by the helical form of the corrugations $a'$, and as the particles of condensation are thrown outwardly by the centrifugal action of the cyclonic movement of the steam they become lodged on the helically-ribbed inner wall of the pipe A' and the drier steam moves centripetally toward the pipe B and through the elongated inclined openings $b$ into the pipe B and thence out through the exit-pipe $A^3$, and the particles of condensation find their way to the drip-chamber $A^2$. From thence they pass through the passage $p$. Such of the steam as does not find its way through the openings $b$ in the pipe B enters it through its depending open end. The helically-ribbed inner walls of the pipe A' and the helically-perforated walls of the pipe B serves to hasten the drainage of the accumulated particles of condensation into the chamber $A^2$, and the serrations $b'$ on the lower end of the conduit B prevent the globules of water from hanging on the end of the conduit and being drawn up by the steam.

What I claim as new is—

1. In a steam-separator, the combination, with a vertically-arranged wet-steam passage or chamber, of a helically-disposed groove on the inner walls of said chamber, for the purposes mentioned.

2. In a steam-separator, the combination, with the dry-steam passage or chamber, of a series of parallel-sided openings through its walls into the wet-steam chamber, which are inclined to the axis of said passages and arranged in alternating vertical order.

3. In a steam-separator, the combination, with the induct-nozzle, the educt-nozzle, the drip-chamber, and the concentric chambers A' and B, connecting, respectively, with the induct and educt nozzles and both opening into the drip-chamber, of a helical groove on the wall of the chamber A' and perforations through the lower portions of the walls of the chamber B.

4. In a steam-separator, the combination, with the induct-nozzle, the educt-nozzle, and the drip-chamber, and the concentric chambers A' and B, connecting, respectively, with the induct and educt nozzles and both opening into the drip-chamber, of a helical groove on the wall of the chamber A' and parallel-sided perforations $b$, arranged helically through the lower portions of the walls of the chamber B.

5. In a steam-separator, the combination, with the induct and educt nozzles, the drip-chamber, and the concentric chambers A' and B, connecting, respectively, with the induct and educt nozzles and opening into the drip-chamber, of openings at the top and bottom of said separator in axial line with said concentric chambers and plugs for closing said openings.

In testimony whereof I affix my signature in presence of two witnesses.

WILLIAM O. WEBBER.

Witnesses:
JNO. K. HALLOCK,
JOHN S. RILLING.